US006571563B2

(12) United States Patent
Yim et al.

(10) Patent No.: US 6,571,563 B2
(45) Date of Patent: Jun. 3, 2003

(54) GAS TURBINE ENGINE WITH OFFSET SHROUD

(75) Inventors: Thomas K. Yim, Torrance, CA (US); Robert A. Nims, Rancho Palos Verdes, CA (US); Mike Masoudipour, Torrance, CA (US)

(73) Assignee: Honeywell Power Systems, Inc., Albuquerque, NM (US)

( * ) Notice: Subject to any disclaimer, the term of this patent is extended or adjusted under 35 U.S.C. 154(b) by 27 days.

(21) Appl. No.: 09/741,476

(22) Filed: Dec. 19, 2000

(65) Prior Publication Data

US 2002/0073714 A1 Jun. 20, 2002

(51) Int. Cl.[7] .............................. F02C 3/04; F02C 7/20; F01D 11/00
(52) U.S. Cl. ..................... 60/796; 60/806; 29/889.2; 415/126; 415/128
(58) Field of Search .................. 60/796, 797, 799, 60/804, 805; 415/126, 128, 133, 134; 29/889.2, 889.21, 889.22

(56) References Cited

U.S. PATENT DOCUMENTS

| | | | |
|---|---|---|---|
| 3,740,164 A | * | 6/1973 | Zerlauth ..................... 60/796 |
| 4,222,708 A | * | 9/1980 | Davison ................... 415/214.1 |
| 4,457,667 A | * | 7/1984 | Seibert et al. ............... 384/582 |
| 4,598,542 A | | 7/1986 | Reynolds |
| 4,754,607 A | | 7/1988 | Mackay |
| 5,079,911 A | | 1/1992 | Kumakura |
| 5,212,940 A | * | 5/1993 | Glover ......................... 60/782 |
| 5,317,865 A | * | 6/1994 | Inoue et al. ................... 60/804 |
| 5,526,640 A | * | 6/1996 | Brooks et al. ................. 60/804 |
| 5,605,438 A | * | 2/1997 | Burdgick et al. ......... 415/182.1 |
| 5,855,112 A | | 1/1999 | Bannai et al. |
| 5,964,663 A | | 10/1999 | Stewart et al. |
| 6,037,687 A | | 3/2000 | Stewart et al. |
| 6,190,048 B1 | | 2/2001 | Weissert |
| 6,198,174 B1 | | 3/2001 | Nims et al. |
| 6,224,332 B1 | * | 5/2001 | Leach et al. ................. 415/126 |
| 6,309,177 B1 | * | 10/2001 | Swiderski et al. .......... 29/889.2 |
| 6,312,217 B1 | * | 11/2001 | Takahashi .................... 415/160 |

FOREIGN PATENT DOCUMENTS

WO    WO1-9709524    3/1997

\* cited by examiner

Primary Examiner—Ted Kim
(74) Attorney, Agent, or Firm—Robert Desmond, Esq.

(57) ABSTRACT

A gas turbine engine having a housing and an axially extending shaft journaled to the housing by two axially spaced apart bearings. The bearings are located along the shaft so as to define an overhung shaft portion. A rotating component such as a turbine wheel or compressor wheel is mounted on the overhung shaft portion and is concentric about the centerline (50) of the engine. An annular shroud (40) that is part of the housing is disposed about the rotating component, the annular shroud (40) being concentric about a centerline (60) radially offset from the engine (50).

10 Claims, 5 Drawing Sheets

GAS TURBINE ENGINE WITH OFFSET SHROUD

TECHNICAL FIELD

This invention relates to gas turbine engines with overhung shafts.

BACKGROUND OF THE INVENTION

The typical gas turbine engine includes a compressor wheel and a turbine wheel mounted on a shaft that is journaled to a housing by two bearings. Ideally, the bearings are located at opposite ends of the shaft. In some engines, one bearing is located at one end of the shaft and the second bearing is located at or near the middle of the length of the shaft. The portion of the shaft extending from the middle bearing to the end of the shaft without a bearing is referred to as the overhung shaft portion. In engines having overhung shaft portions, it is not uncommon to find both the compressor wheel and the turbine wheel mounted on this overhung portion.

A disadvantage to this engine configuration is that the rotating component on the overhung shaft portion farthest from the middle bearing has a tendency to droop or sag due to its own weight. For a variety of reasons, this component is usually the turbine wheel and because of this droop, the turbine blades can rub against the turbine shroud circumscribing the blades. This drooping is illustrated in FIG. 3 which shows a turbine wheel 100 circumscribed by a shroud 102 both of which are concentric about an axial extending centerline 103. Using conventional gas turbine nomenclature, the top 104 of the engine is referred to as the twelve o'clock position and the bottom 106 the six o'clock position. Because of the droop, the clearance between the turbine wheel 100 and shroud 102 is greater at the twelve o'clock position and less at the six o'clock position. Thus, the Applicants have observed rubs between the wheel and shroud at the six o'clock position. Another disadvantage is that as the wheel droops, the clearance between the blades and shroud at the twelve o'clock position increases, thus reducing engine performance.

One proposed solution is to machine a groove into the turbine shroud extending from the five o'clock position to the seven o'clock position. While such a groove avoids the rub, it does not improve the clearance at the twelve o'clock position. Further, the Applicants have found that the machining of this groove is very expensive.

Accordingly, there is a need for a new and useful wheel and shroud arrangement that accounts for rotor droop associated with overhung shaft portions.

SUMMARY OF THE INVENTION

An object of the present invention is to provide a novel arrangement of shroud and wheel that accounts for rotor droop associated with overhung shaft portions.

The present invention meets this objective by providing a gas turbine engine having a housing and an axially extending shaft journaled to the housing by two axially spaced apart bearings. The bearings are located along the shaft to define an overhung shaft portion. A rotating component such as a turbine wheel or compressor wheel is mounted on the overhung shaft portion and is concentric about the centerline of the engine. An annular shroud that is part of the housing is disposed about the rotating component, the annular shroud being concentric about a centerline radially offset from the engine centerline.

These and other objects, features and advantages of the present invention are specifically set forth in or will become apparent from the following detailed description of a preferred embodiment of the invention when read in conjunction with the accompanying drawings.

DETAILED DESCRIPTION OF THE PREFERRED EMBODIMENT

Figure 1:
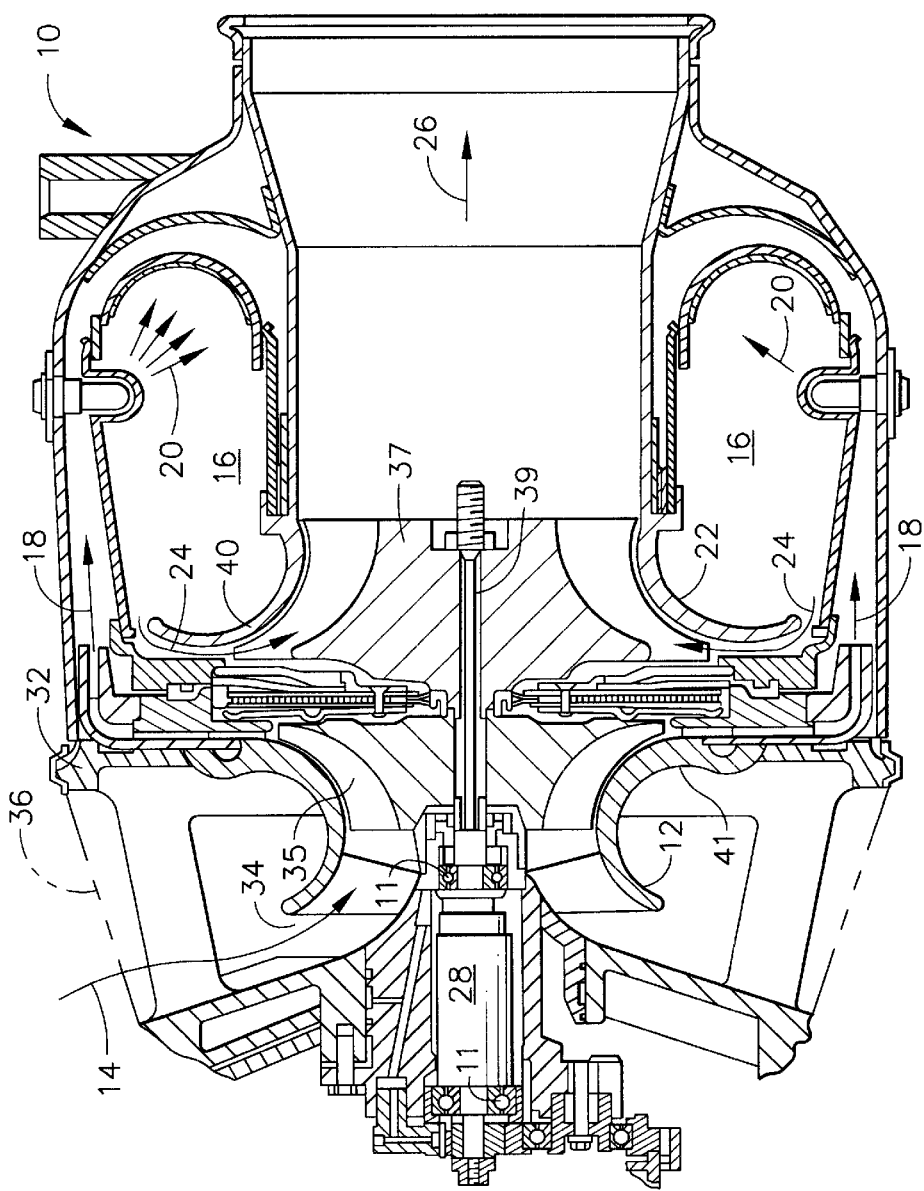
FIG. 1 is a cross-section of a gas turbine engine having an offset shroud contemplated by the present invention.

FIG. 1 shows a cross-section of a gas turbine engine generally denoted by the reference numeral 10. The gas turbine engine 10 includes a compressor section 12 which in operation ingests ambient air, as indicated by arrow 14, and delivers this air pressurized to a combustion section 16, as indicated by arrow 18. A flow of fuel is added to the pressurized air in the combustion section 16 as indicated by arrows 20. The fuel and air are mixed and ignited to produce a flow of hot, pressurized combustion gas that flows through a turbine section 22 as indicated by arrow 24. The gas expands across the turbine section 22 causing it to rotate and produce shaft horsepower for driving the compressor section 12 and shaft 28. The gas exits the engine 10 through an exhaust represented by arrow 26.

A housing 32 defines an inlet 34, which receives ambient air, represented by arrow 14, through an inlet screen 36. The housing 32 journals a rotating or rotor assembly comprising a compressor wheel 35, a turbine wheel 37, an elongate tie bolt 39 and the shaft 28. The rotor assembly is journaled in the housing 32 by a pair of bearings 11 that sustain both radial and thrust loads. The bearings 11 can be oil lubricated bearings, air/foil bearings, magnetic bearings or self lubricated bearings, or a combination thereof.

Figure 2:
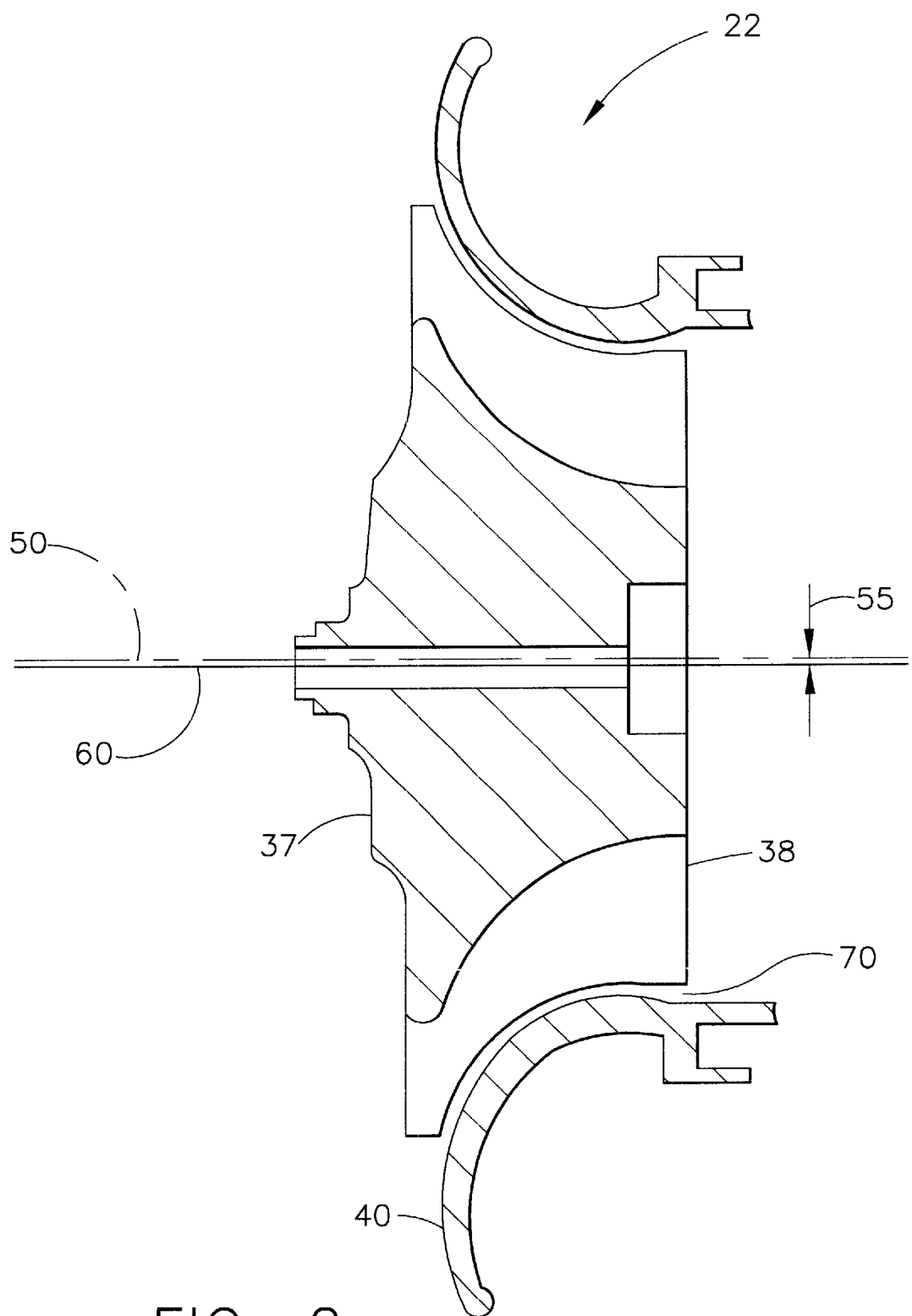
FIG. 2 is a cross-section of the turbine section of the gas turbine engine of FIG. 1.

With continuing reference to FIG. 1, one of the bearings 11 is located at the left end of the shaft 28 and the second bearing 11 is located about halfway from the first bearing 11 to the turbine wheel 37. The portion of the shaft 28 between the second bearing 11 and the turbine wheel 37 is the overhung shaft portion. In the preferred embodiment, the turbine section 22 is comprised of a radial turbine wheel 37 having a plurality of turbine blades 38 extending radially and axially therefrom. The blades 38 are circumscribed by a turbine housing or shroud 40. The turbine wheel 37 is mounted to the overhung shaft portion. Referring to FIG. 2, the turbine wheel 37 and blades 38 are concentric about a first axially extending centerline 50 which, in the preferred embodiment, is coincident with the axial centerline of the engine 10. The shroud 40, however, is concentric about a second axially extending centerline 60 that is radially spaced from the first centerline 50 by the dimension represented by the arrows 55. In the preferred embodiment, using air bearings and an 8.5 lb turbine wheel 37, this dimension is about 0.004 inch. In general for systems using air bearings, the primary considerations for setting the dimension represented by the arrows 55 include (1) the amount of rotor displacement that can occur as the rotor assembly operates in the air bearings 11 (typically called the "sway space") and (2) the weight of the overhung shaft portions. The amount of rotor displacement and the weight of the overhung shaft portions are likewise the driving considerations that apply in setting the dimension 55 for systems using other types of bearings. Straightforward empirical testing, not requiring undue experimentation, can be done to readily provide the appropriate dimension 55 for a given rotor assembly.

Figure 3:
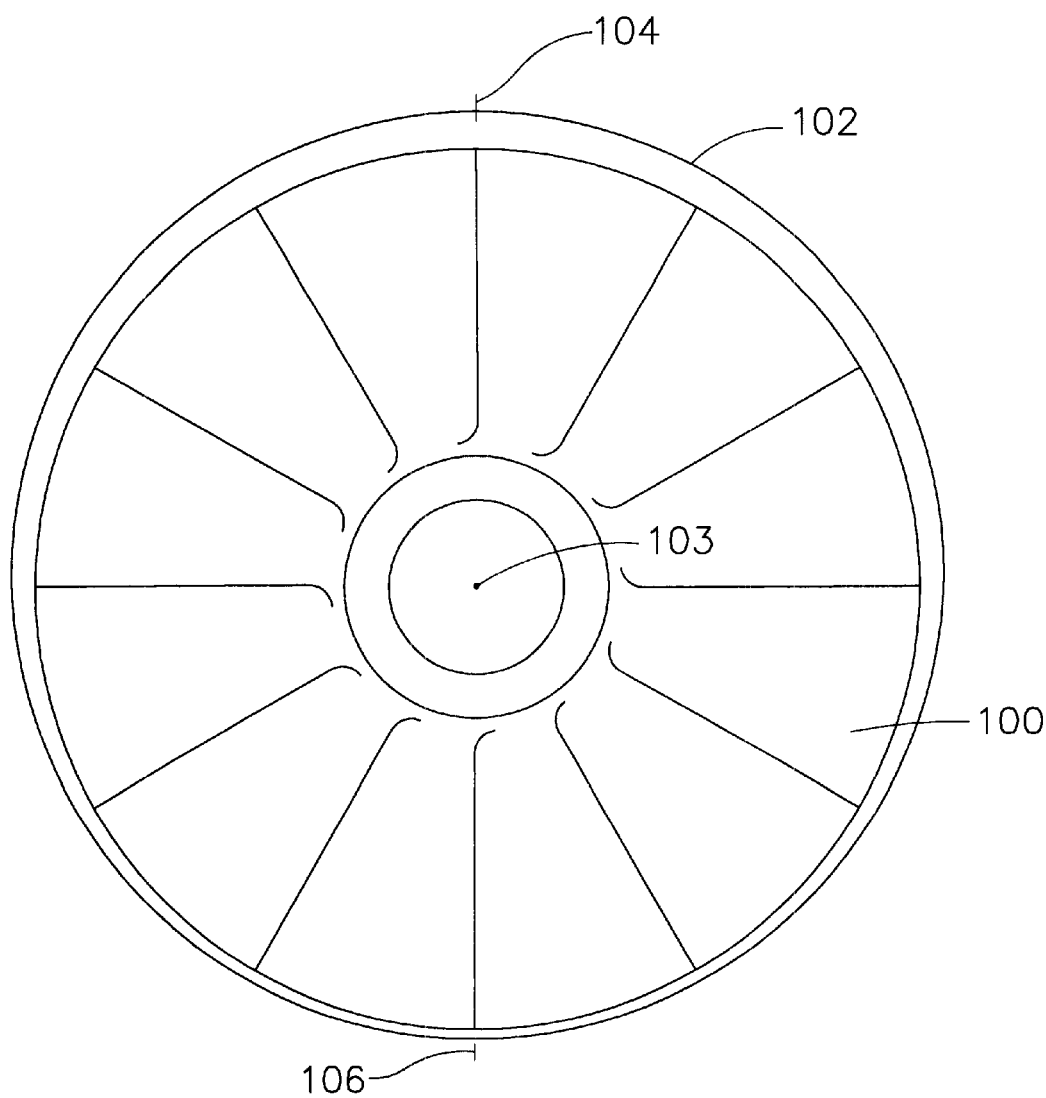
FIG. 3 is an illustration of a drooped turbine wheel.
Figure 4:
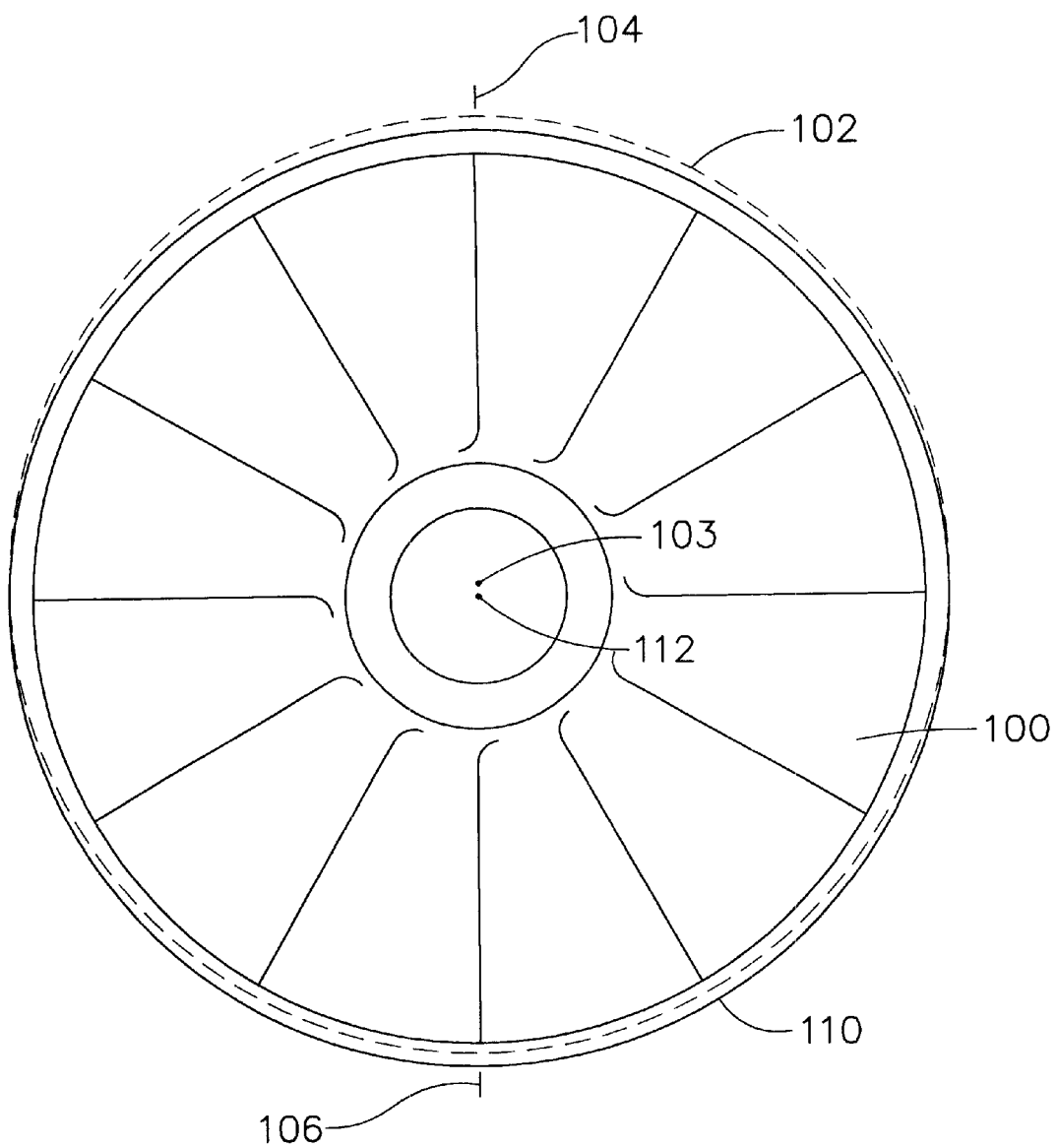
FIG. 4 is an illustration of a turbine wheel with an offset shroud as contemplated by the present invention.
Figure 5:
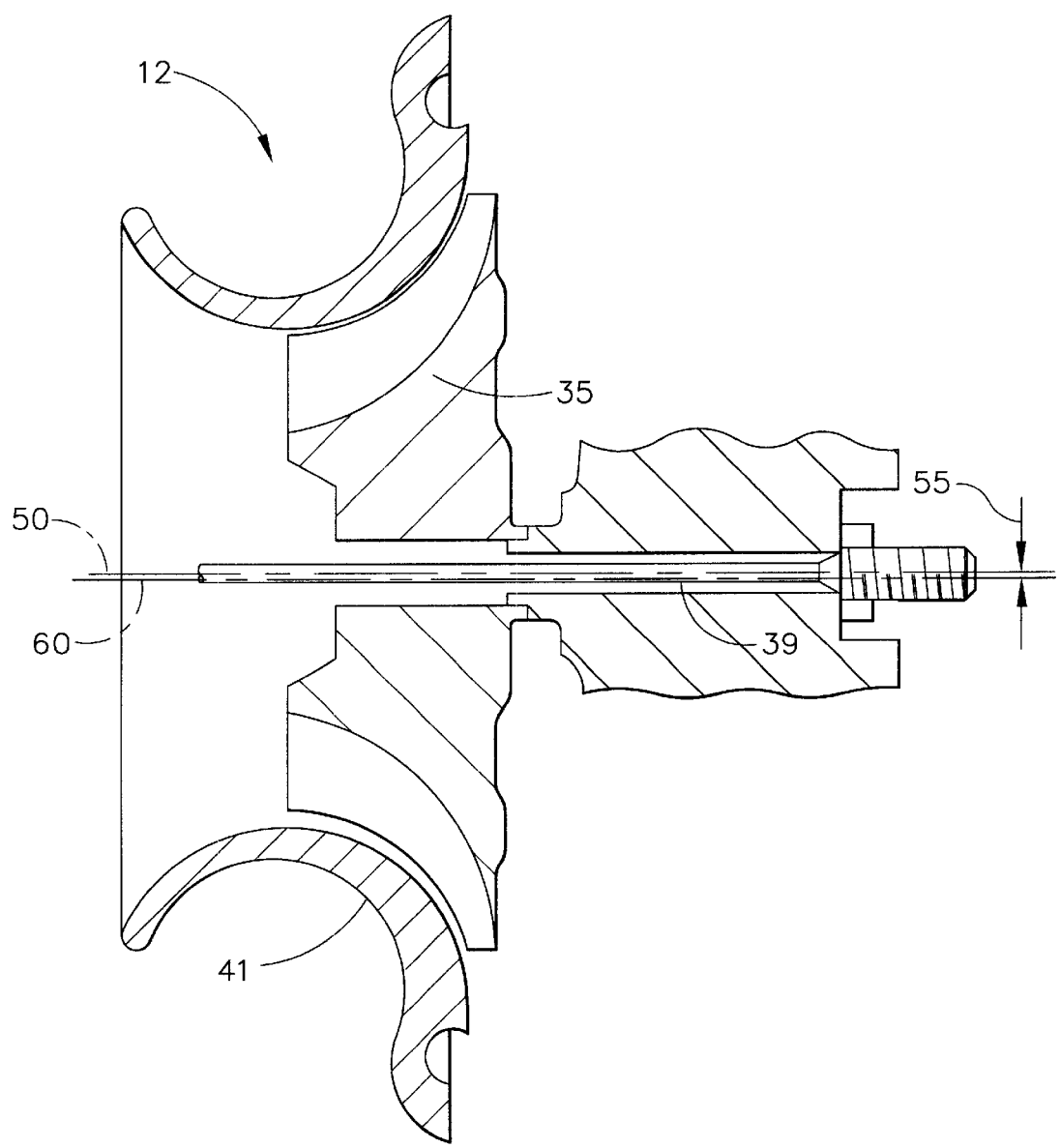
FIG. 5 is a cross-section of a compressor section of the gas turbine engine of FIG. 1.

In the arrangement described above, the clearance 70 between the shroud 40 and the tip of the blades 38 is the same as if the turbine section 22 was mounted between the two bearings 11. This new and useful arrangement of shroud 40 to wheel 37 accounts for the rotor droop associated with overhung shaft portions. The advantage of the present invention over the prior art can be seen in FIG. 4. The dashed circle 102 represents the shroud 102 from FIG. 3 that is concentric around the centerline 103. The solid circle 110 is the offset shroud contemplated by the present invention that is concentric about the axial extending centerline 112. Looking at this FIG. 4, the clearance between the drooped turbine wheel 100 relative to the offset shroud 110 is fairly constant around the circumference of the wheel. In contrast, the clearance between the wheel 100 and the dashed circle 102 is not constant, but instead the clearance at the six o-clock position is much less than the clearance at the twelve o-clock position.

In an alternative embodiment, the rotating component can be a compressor wheel 35 and the offset shroud a compressor shroud 41. Further, the present invention can also be used with axial compressors and axial turbines.

Various modifications and alterations of the above described rotor assembly will be apparent to those skilled in the art. Accordingly, the foregoing detailed description of the preferred embodiment of the invention should be considered exemplary in nature and not as limiting to the scope of the invention as set forth in the following claims.

What is claimed is:

1. A gas turbine engine comprising:
a housing including an integral annular shroud;
a shaft extending axially from a first end to a second end, the shaft journaled to the housing by a first and second bearing, the first bearing located near the first end and the second bearing located between the first bearing and the second end to define an overhung shaft portion that extends from the second bearing to the second end of the shaft;
a plurality of rotating components comprising at least one turbine wheel and at least one compressor wheel, wherein all of the rotating components are mounted on the overhung shaft portion of the shaft and concentric about a first centerline; and
wherein the integral annular shroud is disposed about a selected rotating component, the integral annular shroud being concentric about a second centerline radially offset from the first centerline, the second centerline being offset a predetermined amount based upon the sway space of the bearings and a weight of the rotating components on the overhang portion, whereby a clearance between the integral annular shroud and the selected rotating component is substantially constant around the entire circumference of the selected rotating component.

2. The gas turbine engine of claim 1, wherein the radial offset between the first centerline and the second centerline is about 0.004 inch.

3. The gas turbine engine of claim 1, wherein the shroud is disposed about the turbine wheel.

4. The gas turbine engine of claim 1, wherein the shroud is disposed about the compressor wheel.

5. The gas turbine engine of claim 1, wherein the first centerline is coincident with the centerline of the gas turbine engine.

6. A gas turbine engine comprising:
a housing including an integral annular shroud;
a shaft extending axially from a first end to a second end, the shaft journaled to the housing by a first and second air bearing, the first air bearing located near the first end and the second air bearing located between the first air bearing and the air second end to define an overhung shaft portion that extends from the air second bearing to the second end of the shaft;
a turbine wheel and a compressor wheel mounted on the overhung shaft portion of the shaft and concentric about a first centerline; and
wherein the integral annular shroud is disposed about the turbine wheel, the integral annular shroud being concentric about a second centerline radially offset from the first centerline, the second centerline being offset about 0.004 inch, whereby a clearance between the integral annular shroud and the turbine wheel is substantially constant around the entire circumference of the turbine wheel.

7. The gas turbine engine of claim 6, wherein the first centerline is coincident with the centerline of the gas turbine engine.

8. A gas turbine engine comprising:
a housing including an integral annular shroud;
a shaft extending axially from a first end to a second end, the shaft journaled to the housing by a first and second bearing, the first bearing located near the first end and the second bearing located between the first bearing and the second end to define an overhung shaft portion that extends from the second bearing to the second end of the shaft;
a turbine wheel and a compressor wheel mounted on the overhung shaft portion of the shaft and concentric about a first centerline;
wherein the integral annular shroud is disposed about the compressor wheel, the integral annular shroud being concentric about a second centerline radially offset from the first centerline, the second centerline being offset about 0.004 inch, whereby a clearance between the integral annular shroud and the turbine wheel is substantially constant around the entire circumference of the turbine wheel; and
wherein the first centerline is coincident with the centerline of the gas turbine engine.

9. The gas turbine engine of claim 8, wherein the radial offset between the first centerline and the second centerline is about 0.004 inch.

10. A method for making a gas turbine engine, comprising:
providing a housing having an integral annular shroud;
extending a shaft axially, along a first centerline, from a first end to a second end, the shaft journaled to the housing by a first and second bearing, the first bearing located near the first end and the second bearing located between the first bearing and the second end to define an overhung shaft portion that extends from the second bearing to the second end of the shaft;
attaching a turbine wheel to the overhung shaft portion at a location wherein the integral annular shroud is disposed about said turbine wheel;
determining an offset amount of which the first centerline is offset at a location where the turbine wheel is attached by considering a sway space of the first and second bearings, the weight of the turbine wheel, and the location of the turbine wheel on the overhung shaft portion; and positioning the integral annular shroud at a second centerline radially offset from the first centerline by the offset, whereby a clearance between the integral annular shroud and the turbine wheel is substantially constant around the entire circumference of the turbine wheel.

* * * * *